(12) United States Patent
Puckett

(10) Patent No.: US 10,551,562 B1
(45) Date of Patent: Feb. 4, 2020

(54) ANTI-REFLECTIVE AND RESONANT WAVEGUIDE GRATING TO FREE-SPACE COUPLERS

(71) Applicant: Honeywell International Inc., Morris Plains, NJ (US)

(72) Inventor: Matthew Wade Puckett, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/041,036

(22) Filed: Jul. 20, 2018

(51) Int. Cl.
| G02B 6/12 | (2006.01) |
| G02B 6/124 | (2006.01) |
| G01S 7/481 | (2006.01) |
| H04B 10/11 | (2013.01) |

(52) U.S. Cl.
CPC ............ *G02B 6/124* (2013.01); *G01S 7/4814* (2013.01); *G02B 6/12007* (2013.01); *H04B 10/11* (2013.01); *G02B 2006/12147* (2013.01)

(58) Field of Classification Search
CPC ......... G02B 6/12; G02B 6/4214; G02B 6/124
See application file for complete search history.

(56) References Cited

U.S. PATENT DOCUMENTS

| 5,033,812 A | 7/1991 | Yoshida et al. |
| 5,101,459 A | 3/1992 | Sunagawa |
| 5,420,947 A | 5/1995 | Li et al. |
| 6,243,517 B1 * | 6/2001 | Deacon ................. G02B 6/1228 372/102 |
| 7,162,124 B1 | 1/2007 | Gunn et al. |
| 7,184,625 B2 | 2/2007 | Gunn, III et al. |
| 7,245,803 B2 | 7/2007 | Gunn, III et al. |
| 7,260,293 B1 | 8/2007 | Gunn et al. |
| 7,298,771 B2 * | 11/2007 | Volodin ............. G02B 27/0944 372/102 |
| 7,397,987 B2 | 7/2008 | Witzens et al. |
| 9,632,281 B2 | 4/2017 | Miao et al. |
| 2011/0150386 A1 | 6/2011 | Dupuis et al. |
| 2014/0363127 A1 | 12/2014 | Baets et al. |

OTHER PUBLICATIONS

Chen; "Apodized Waveguide Grating Couplers for Efficient Coupling to Optical Fibers", IEEE Photonics Technology Letters, Aug. 1, 2010, pp. 1-3, vol. 22, No. 15, IEEE.
Song, "Grating Coupler Design for Reduced Back-Reflections", IEEE Photonics Technology Letters, Jan. 15, 2018, pp. 1-4, vol. 30, No. 2, IEEE.

* cited by examiner

*Primary Examiner* — Jennifer Doan
(74) *Attorney, Agent, or Firm* — Fogg & Powers LLC

(57) ABSTRACT

Free-space coupler devices are disclosed. In one embodiment, a free-space coupler device comprises a waveguide structure including a waveguide grating, and an out-of-plane coupler separated from and in optical communication with the waveguide grating. The waveguide grating and the out-of-plane coupler are separated by a distance that will yield an optical resonance at a desired operating frequency or wavelength of an optical signal, thereby maximizing a diffraction power of the optical signal at the out-of-plane coupler while minimizing a reflection power of the optical signal at the out-of-plane coupler.

20 Claims, 8 Drawing Sheets

ANTI-REFLECTIVE AND RESONANT WAVEGUIDE GRATING TO FREE-SPACE COUPLERS

BACKGROUND

In integrated photonics, there is an ongoing effort to design structures which efficiently couple light among nanoscale waveguides and standard single-mode optic fibers. The waveguide grating coupler is one such structure which employs a Bragg grating to diffract light out of the plane of a waveguide so that it may be received by a fiber. One problem faced by grating couplers currently is that, at the interface between the waveguide and the grating, a portion of the incident light gets reflected back into the waveguide and propagates counter to the initially injected mode. This portion of the light, in addition to not being coupled into the output fiber, can pollute the signal at other of the chip's output ports.

In some prior approaches, unwanted back-reflections have been inhibited by orienting the front face of the grating coupler at an oblique angle to the incident beam. This technique does not, however, convert the reflected power into light which diffracts from the grating as intended, and so does not improve the diffraction efficiency.

SUMMARY

Free-space coupler devices are disclosed and described herein. In one embodiment, a free-space coupler device comprises a waveguide structure including a waveguide grating, and an out-of-plane coupler separated from and in optical communication with the waveguide grating. The waveguide grating and the out-of-plane coupler are separated by a distance that will yield an optical resonance at a desired operating frequency or wavelength of an optical signal, thereby maximizing a diffraction power of the optical signal at the out-of-plane coupler while minimizing a reflection power of the optical signal at the out-of-plane coupler.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
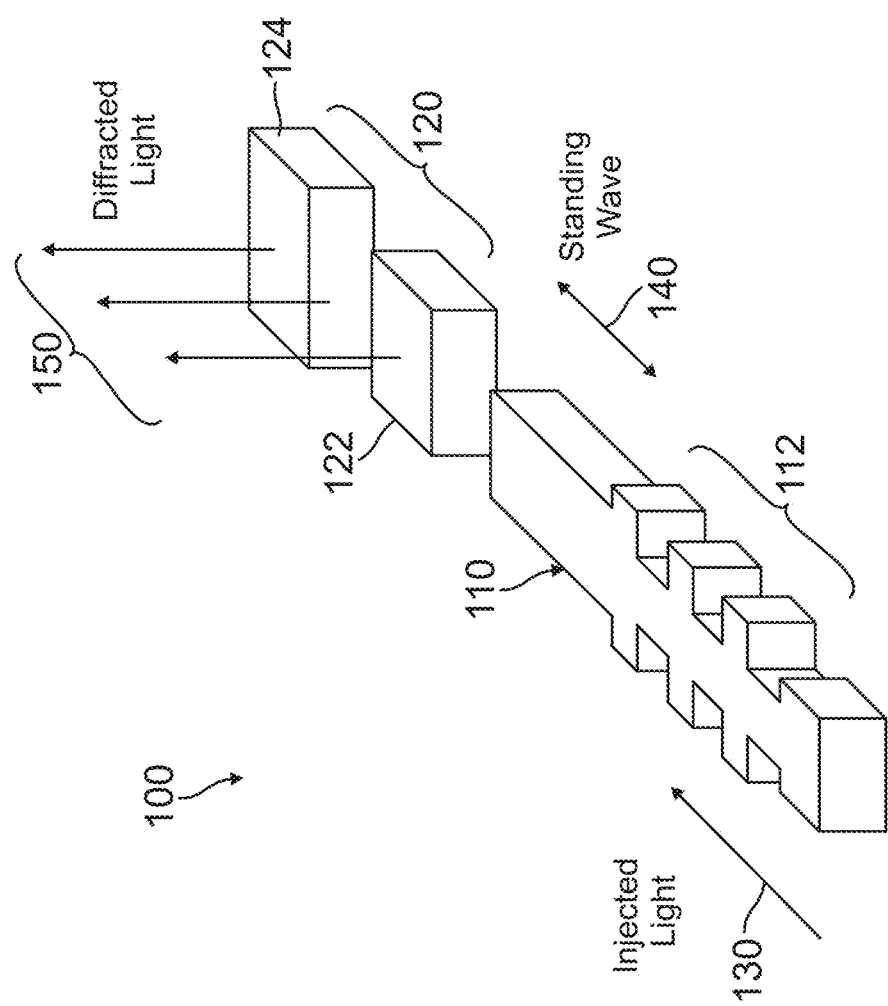
FIG. 1 is an isometric view of an anti-reflective free-space coupler device, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Various embodiments of anti-reflective and resonant waveguide grating to free-space couplers are disclosed herein. The present embodiments can be implemented in various configurations to provide chip-to-free-space couplers, for example.

In one embodiment, a free-space coupler device includes a waveguide grating, such as a Bragg grating, incorporated into a waveguide structure on a chip, and spaced apart from an out-of-plane coupler, such as a grating coupler, to create an optical cavity between the waveguide grating and the out-of-plane coupler. The grating coupler can include one or more grating elements that provide one or more grating periods.

If the reflectivity of the waveguide grating satisfies the condition for critical coupling into a resonator, the total back-reflected power of the waveguide structure as a whole can reach an arbitrarily low value. Furthermore, the portion of the incident light that would have been reflected is now diffracted from the grating coupler as intended, improving the efficiency of the device. This benefit is of large value to applications such as beam steering for light detection and ranging (LiDAR) applications, including for autonomous vehicles and free-space optical communications, where minimization of optical insertion loss is critical.

The free-space coupler device can be made by first fabricating a grating coupler without the waveguide grating included, and measuring the backreflected power. Based on this measurement, a waveguide grating such as a Bragg grating can be designed that is critically coupled to the grating coupler. Finally, a separation distance between the waveguide grating and the grating coupler is determined that will yield an optical resonance at the desired operating frequency/wavelength. This can be done with a parametric sweep of fabricated devices, or prior to fabrication through finite element method (FEM) simulations. When reflection coefficients are matched, a resonance between the waveguide grating and the grating coupler can be obtained. The fabrication of an integrated photonics platform that incorporates the waveguide grating coupler device can generally follow conventional microfabricating steps.

The diffraction efficiency of the free-space coupler device can be maximized at a particular wavelength, with a reflection substantially reduced at the particular wavelength. For example, the separation distance between the waveguide grating and the grating coupler can be selected such that a peak of diffraction efficiency matches a minimized reflection (zero or close to zero) at a particular wavelength.

The free-space coupler device can be implemented singly or multiply in a variety of optical systems. For example, the free-space coupler device can be implemented in various integrated photonics applications such as integrated photonics circuits or chips; in various LiDAR systems; in free-space optical communication systems; in Li-Fi systems; in emitters for an optical phased array; or the like.

Further details of various embodiments are described hereafter with reference to the drawings.

FIG. 1 illustrates an anti-reflective free-space coupler device 100, according to one embodiment. The free-space coupler device 100 includes a waveguide structure 110 having a waveguide grating 112. The waveguide structure 110 and waveguide grating 112 can be implemented in a substrate such as a photonics chip, for example. The waveguide structure 110 is separated from and in optical communication with an out-of-plane coupler such as a grating coupler 120. In this embodiment, grating coupler 120 has a pair of grating elements 122, 124. In other embodiments, grating coupler 120 can have more or less grating elements. In one embodiment, waveguide grating 112 is formed as a waveguide Bragg grating.

The waveguide grating 112 and grating coupler 120 are separated by a predetermined distance that will yield an optical resonance, or standing wave, at a desired operating frequency or wavelength of an optical signal. This will maximize a diffraction power of diffracted light that exits grating coupler 120 while minimizing a reflection power of the optical signal.

As shown in FIG. 1, during an exemplary operation of free-space coupler device 100, injected light 130 is transmitted through waveguide structure 110 and waveguide grating 112, and a standing wave 140 is formed in an optical cavity between waveguide grating 112 and grating coupler 120. This results in the incident light that would have been reflected now being diffracted with diffracted light 150 from grating coupler 120.

In some embodiments, the configuration of waveguide grating 112 and grating coupler 120 can be optimized for selected wavelengths of light, such that the reflection power of the injected light at the selected wavelengths is effectively zero.

Figure 2:
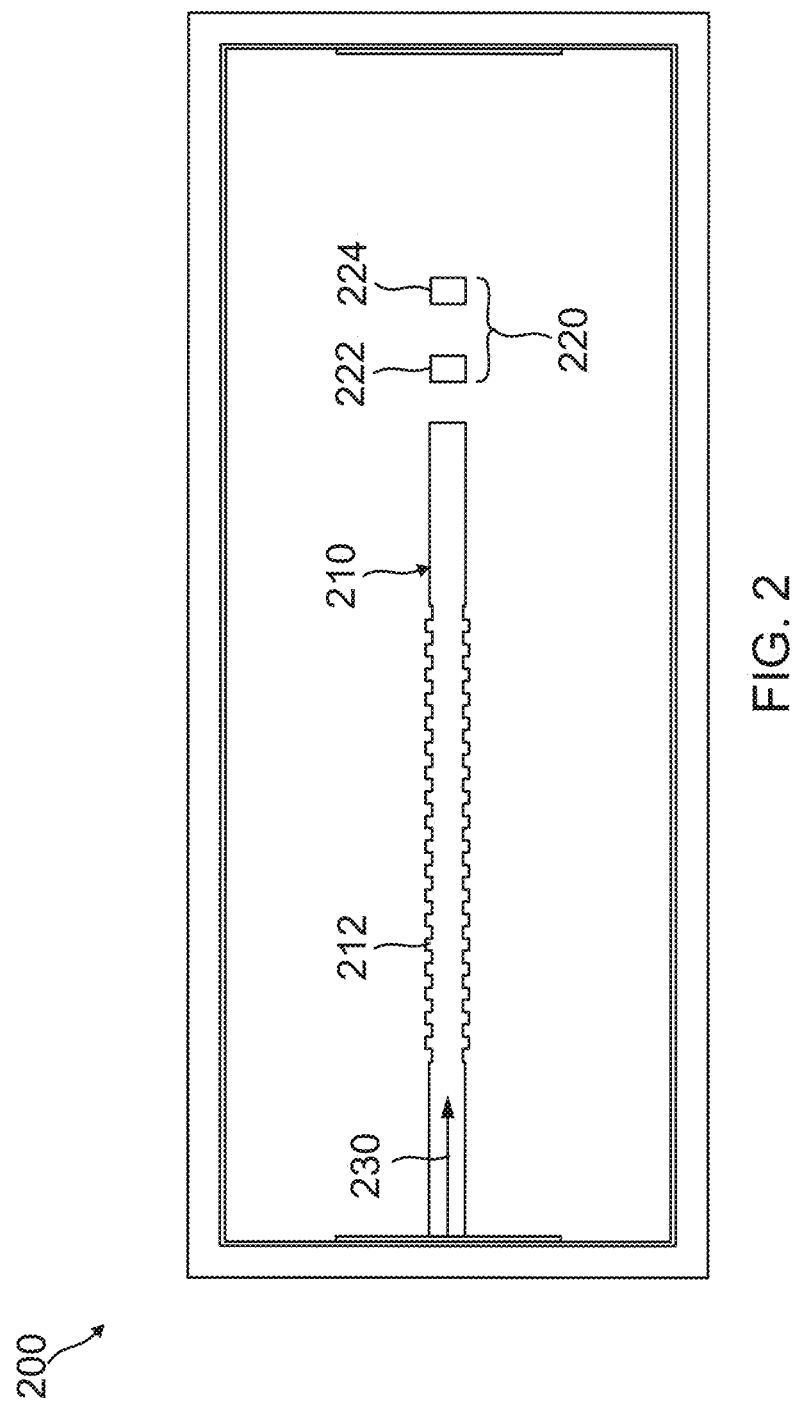
FIG. 2 is a plan view of a design for an anti-reflective free-space coupler device, according to another embodiment.

FIG. 2 is a plan view of a design for an anti-reflective free-space coupler device 200, according to another embodiment. The free-space coupler device 200 includes a waveguide structure 210 having a waveguide grating 212, such as a Bragg grating, which is in optical communication with a grating coupler 220. In this embodiment, grating coupler 220 has a pair of grating elements 222, 224.

The waveguide grating 212 and grating coupler 220 are separated by a predetermined distance that will yield an optical resonance at a desired operating frequency or wavelength of an optical signal such as a light beam 230. This maximizes a diffraction power of diffracted light that exits grating coupler 220 while minimizing a reflection power of the optical signal.

Figure 3A:
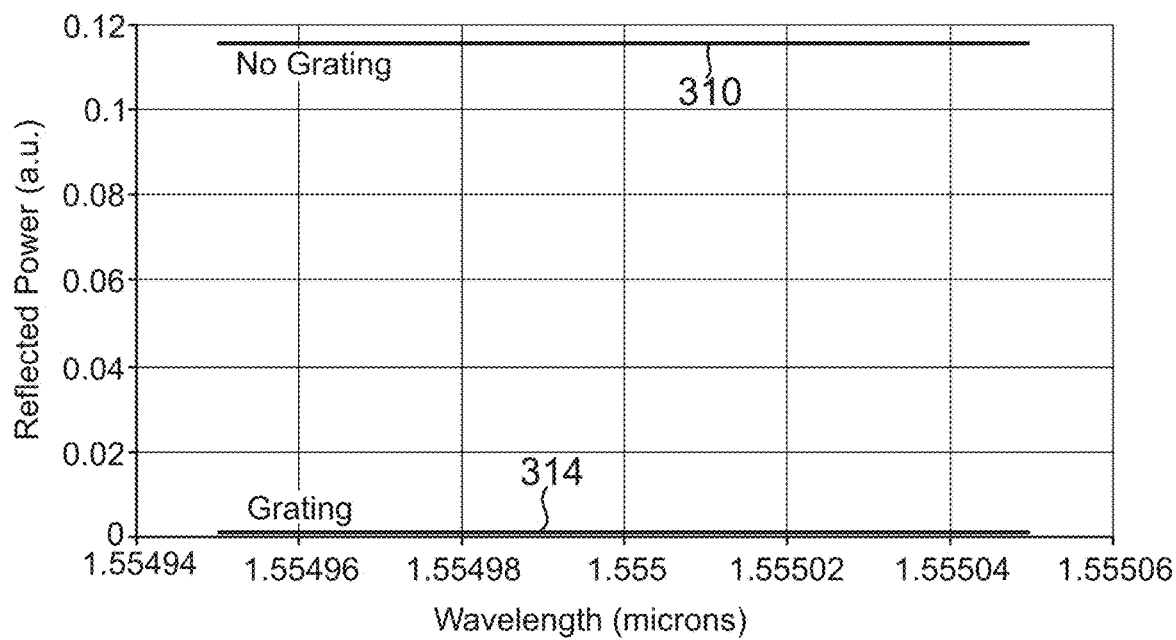
FIGS. 3A and 3B are plots based on a simulated performance of the free-space coupler device of FIG. 2, compared to a grating coupler with no waveguide grating.
Figure 3B:
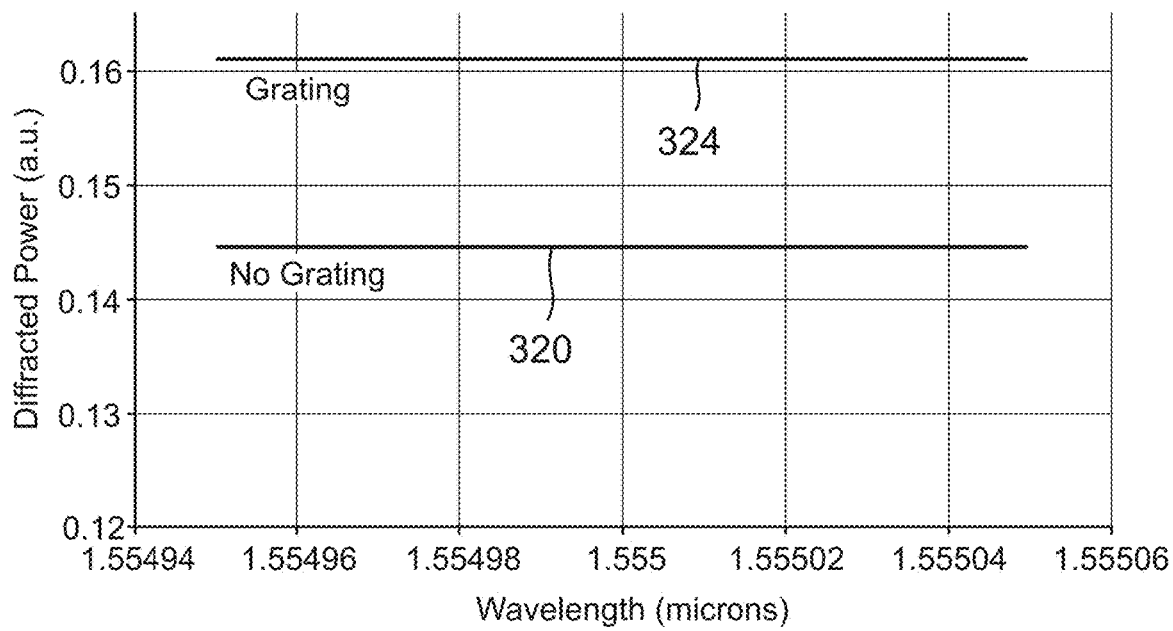

FIGS. 3A and 3B are plots based on a simulated performance of free-space coupler device 200 compared to a grating coupler with no waveguide grating. FIG. 3A is a plot of reflection (reflected power) with respect to wavelength. FIG. 3B is a plot of diffraction (diffracted power) with respect to wavelength.

As shown in FIG. 3A, when no waveguide grating is used, plot line 310 indicates that the grating coupler has a reflected power of almost 12% (0.12 a.u.), whereas plot line 314 indicates that free-space coupler device 200, with the waveguide grating, has a reflected power of effectively zero.

As depicted in FIG. 3B, when no waveguide grating is used, plot line 320 indicates that the grating coupler has a diffracted power of about 14.5% (0.145 a.u.), whereas plot line 324 indicates that free-space coupler device 200, with the waveguide grating, has a diffracted power of over 16% (0.16 a.u.).

Figure 4:
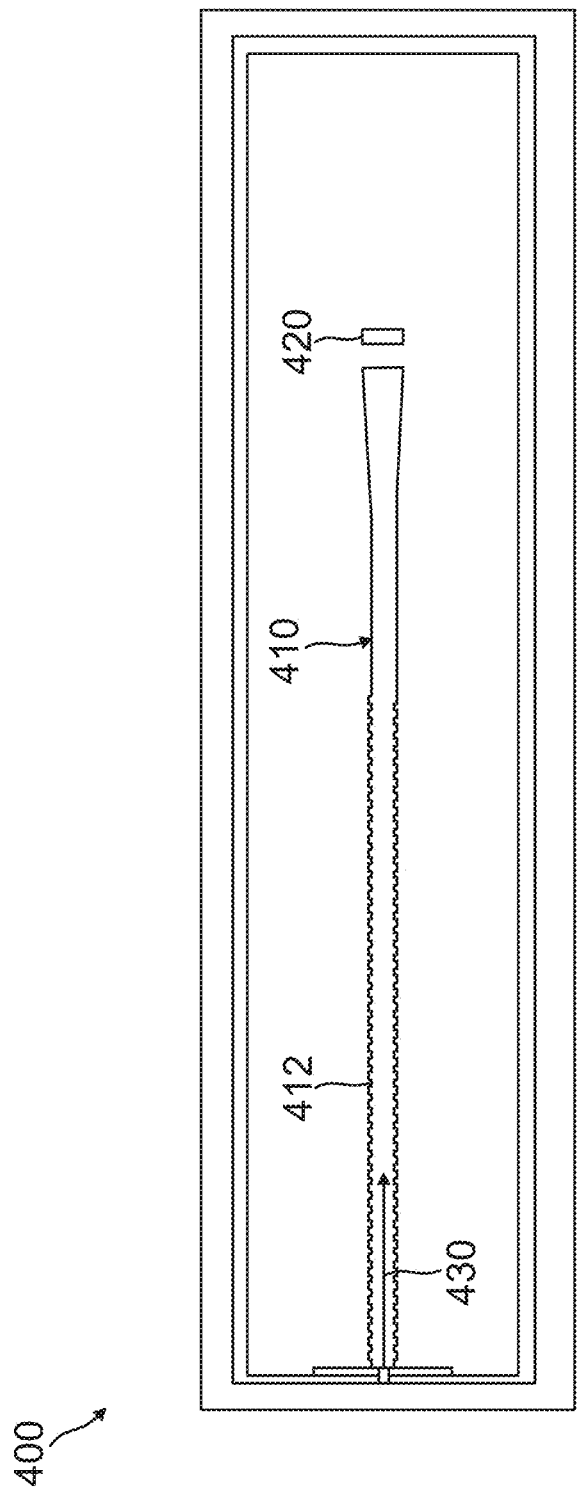
FIG. 4 is a plan view of a design for an anti-reflective free-space coupler device, according to another embodiment, which is optimized for high divergence and efficiency.

FIG. 4 is a plan view of a design for an anti-reflective free-space coupler device 400, according to another embodiment, which is optimized for high divergence and efficiency.

The free-space coupler device 400 includes a waveguide 410 having a waveguide grating 412, such as a Bragg grating, which is in optical communication with a grating coupler 420. In this embodiment, grating coupler 420 has a single grating element, and a metallic layer is included beneath waveguide 410.

The waveguide grating 412 and grating coupler 420 are designed to be separated by a distance that will yield an optical resonance at a desired operating frequency or wavelength of an optical signal such as a light beam 430. This maximizes a diffraction power of diffracted light that exits grating coupler 420 while minimizing a reflection power of the optical signal.

Figure 5A:
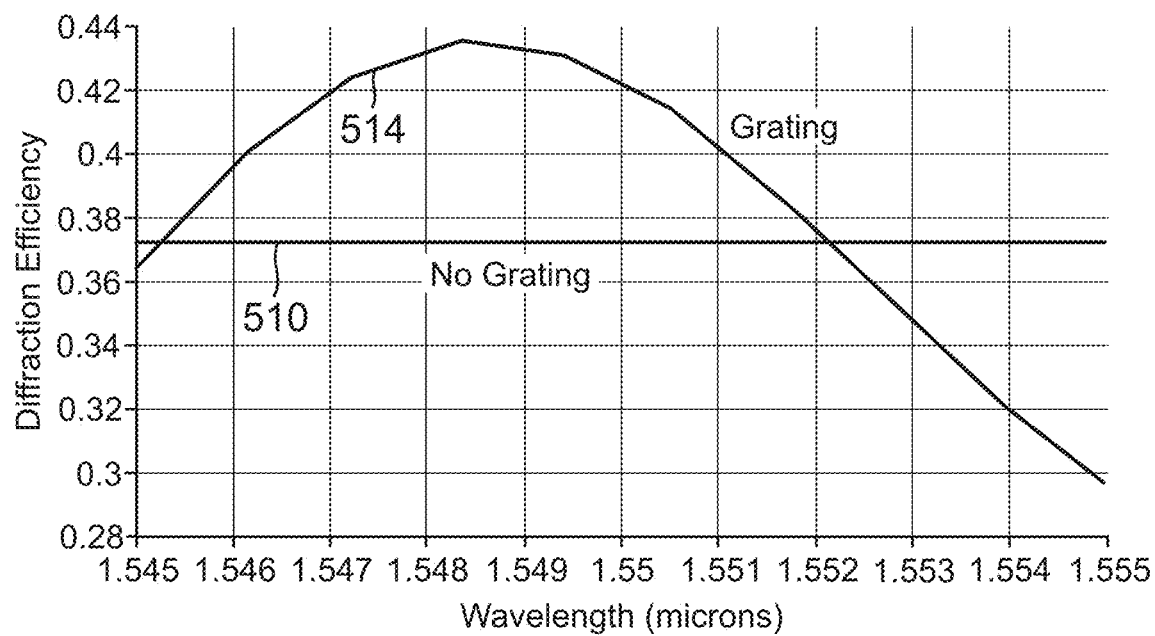
FIGS. 5A and 5B are plots based on a simulated performance of the free-space coupler device of FIG. 4, compared to a grating coupler with no waveguide grating.
Figure 5B:
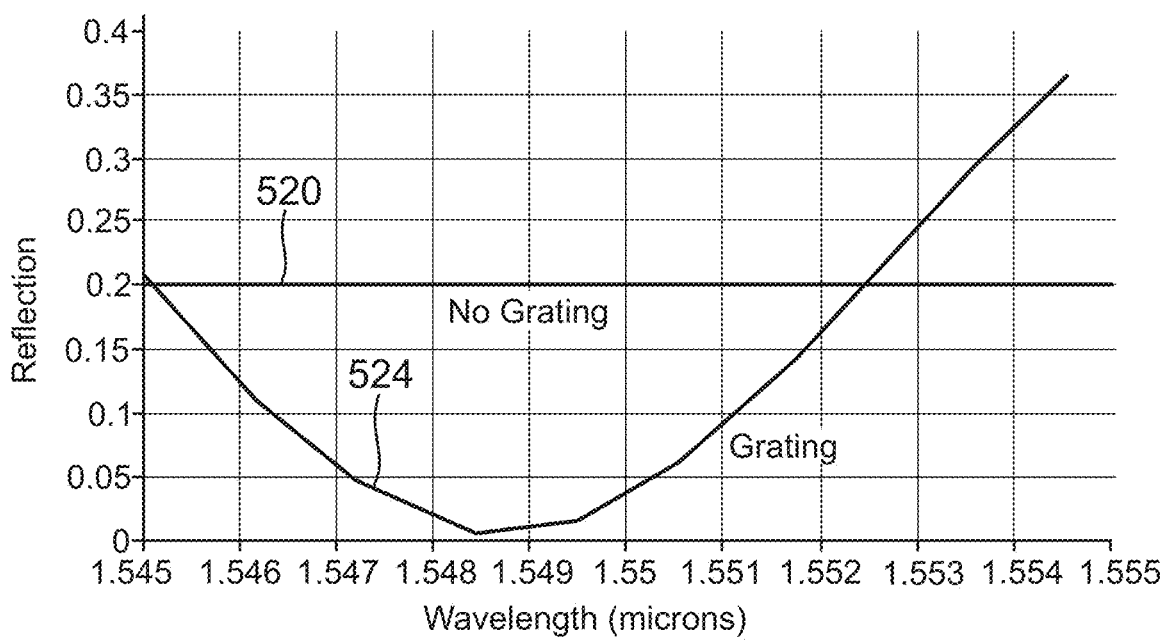

FIGS. 5A and 5B are plots based on a simulated performance of free-space coupler device 400 compared to a grating coupler with no waveguide grating. FIG. 5A is a plot of diffraction efficiency with respect to wavelength. FIG. 5B is a plot of reflection with respect to wavelength.

As shown in FIG. 5A, when no waveguide grating is used, plot line 510 indicates that the grating coupler maintains the same diffraction efficiency of about 37% (0.37) over a range of wavelengths, and cannot be optimized to increase diffraction efficiency for particular wavelengths. In contrast, plot line 514 indicates that free-space coupler device 400, with the waveguide grating, has a diffraction efficiency that is maximized to about 44% (0.33) at a specific wavelength.

As depicted in FIG. 5B, when no waveguide grating is used, plot line 520 indicates that the grating coupler has a reflection of about 20% (0.2), and cannot be optimized to reduce reflections for particular wavelengths. In contrast, plot line 524 indicates that free-space coupler device 400, with the waveguide grating, has a reflection that is substantially reduced to almost 0% at the same specific wavelength where diffraction efficiency is maximized.

Figure 6:
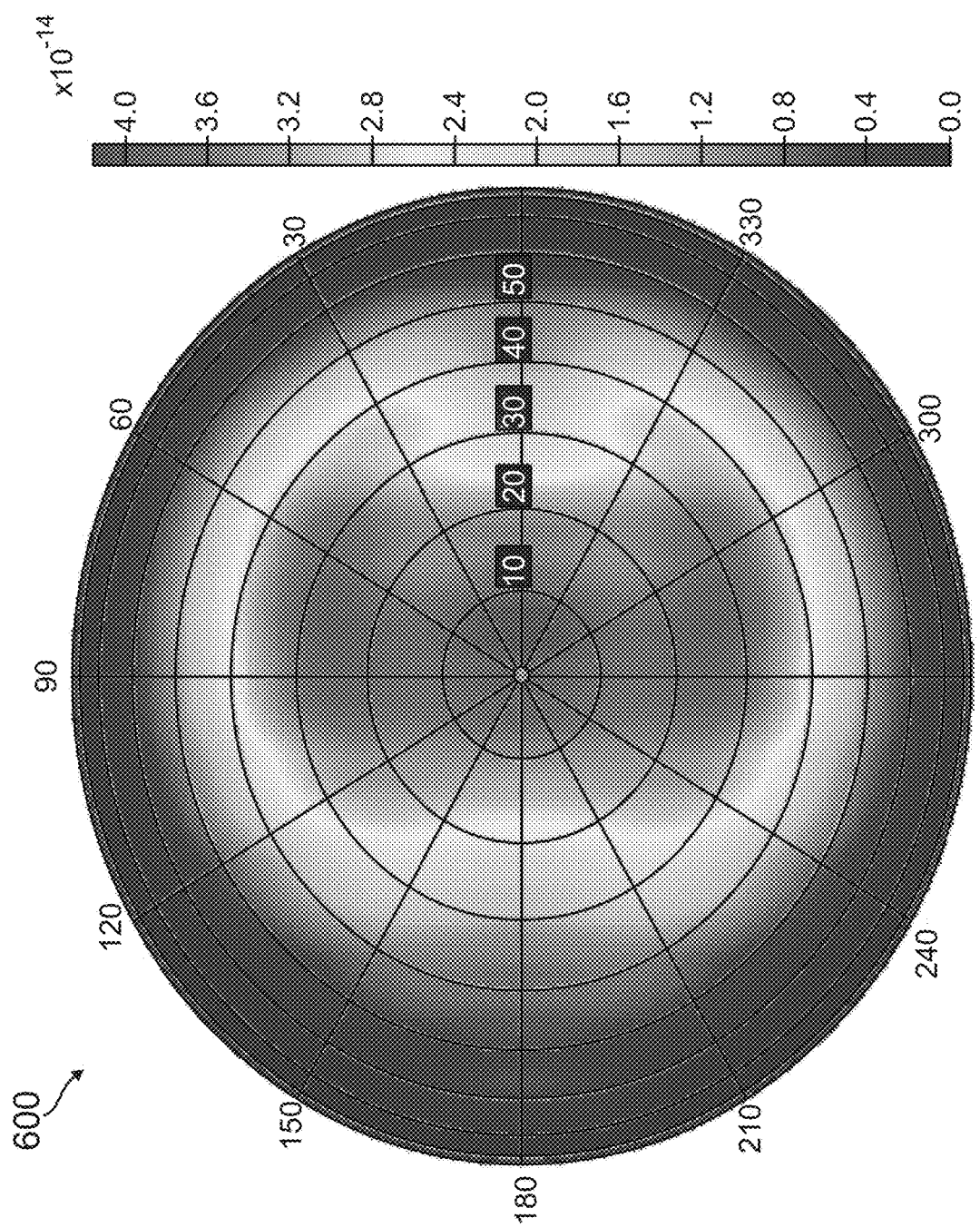
FIG. 6 is a graphical representation of a far field emission pattern for the free-space coupler device of FIG. 4.

FIG. 6 is a graphical representation of a far field emission pattern 600 for free-space coupler device 400. The center of emission pattern 600 represents an orthogonal direction to a surface of a chip where free-space coupler device 400 would be located. The lighter shaded area around the center of emission pattern 600 indicates the directions having the highest emission power. The darker shaded area of emission pattern 600 indicates the directions having low or no power.

Figure 7:
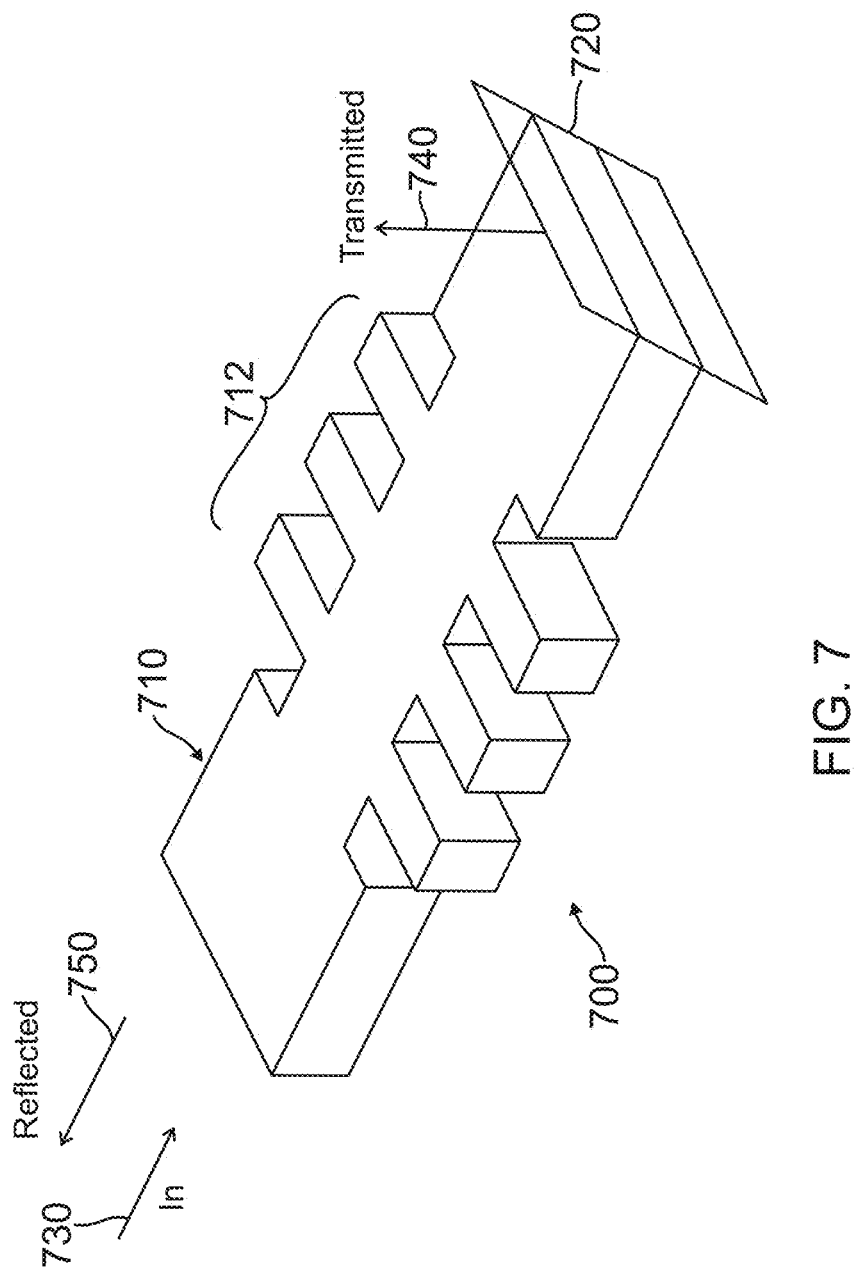
FIG. 7 an isometric view of an anti-reflective free-space coupler device, according to a further embodiment.

FIG. 7 illustrates an anti-reflective free-space coupler device 700, according to another embodiment. The free-space coupler device 700 includes a waveguide structure 710 having a waveguide grating 712. The waveguide structure 710 and waveguide grating 712 can be implemented in a substrate such as a photonics chip, for example. The waveguide structure 710 is separated from and in optical communication with an out-of-plane coupler, such as a focused ion beam etched mirror 720, located at one end of waveguide structure 710.

The focused ion beam etched mirror 720 can be formed by etching the end of waveguide structure 710 at an angle so as to reflect light along the surface normal. In one embodiment, waveguide grating 712 is formed as a waveguide Bragg grating. The waveguide grating 712 and focused ion beam etched mirror 720 are formed so as to be separated by a predetermined distance that will yield an optical resonance, or standing wave, at a desired operating frequency or wavelength of light.

As shown in FIG. 7, during an exemplary operation of free-space coupler device 700, injected light 730 is sent through waveguide structure 710 and waveguide grating 712. A standing wave is formed in an optical cavity between waveguide grating 712 and focused ion beam etched mirror 720. This maximizes a diffraction power of diffracted light 740 that is transmitted while minimizing a reflection power of any reflected light 750.

Figure 8:
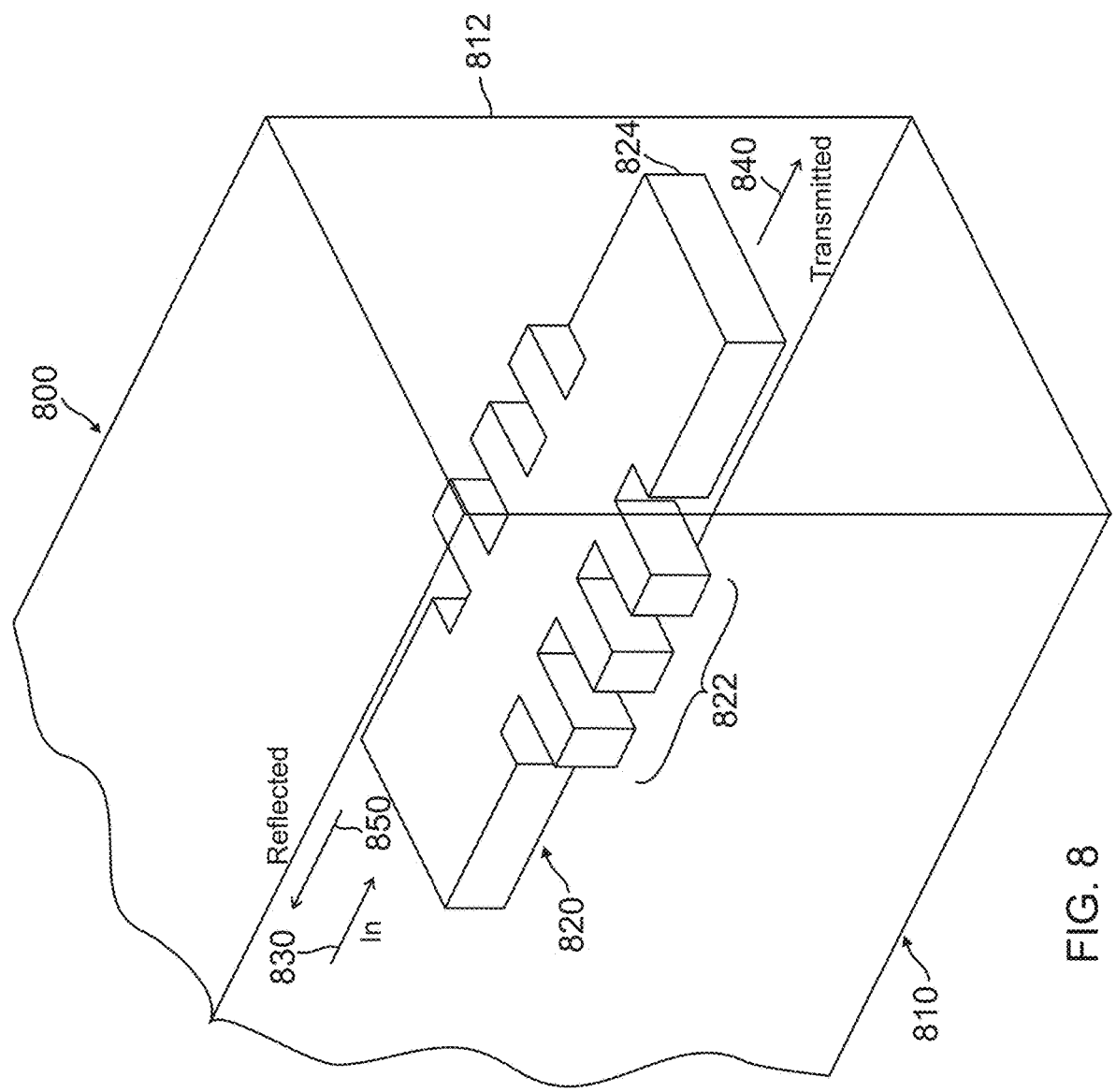
FIG. 8 is an isometric view of an anti-reflective free-space coupler device, according to an alternative embodiment.

FIG. 8 illustrates an anti-reflective free-space coupler device 800, according to an alternative embodiment. The free-space coupler device 800 includes a substrate 810 that includes a facet 812 at one end of substrate 810. A waveguide structure 820 including a waveguide grating 822 and is located on substrate 810. A transmission end 824 of waveguide structure 820 adjoins with facet 812.

The substrate 810 can be a photonics chip having a facet cleaved at one end, for example. In one embodiment, waveguide grating 822 is formed as a waveguide Bragg grating. The free-space coupler device 800 can be implemented in embodiments where optical fibers are typically butt-coupled to waveguides, for example.

The waveguide grating 822 and transmission end 824 that adjoins with facet 812 are separated by a distance that will yield an optical resonance at a desired operating frequency or wavelength of an optical signal. This allows the transmission power of the optical signal to be maximized at a particular wavelength, while the reflection power of the optical signal is minimized at the particular wavelength. In some embodiments, waveguide grating 822 can be configured such that the reflection power of the optical signal at facet 812 is effectively zero.

As shown in FIG. 8, during an exemplary operation of free-space coupler device 800, injected light 830 is sent through waveguide structure 810 and waveguide grating 812. A standing wave is formed in an optical cavity between waveguide grating 822 and facet 812. This maximizes a transmission power of transmitted light 840 away from facet 812 while minimizing a reflection power of any reflected light 850.

Example Embodiments

Example 1 includes a free-space coupler device comprising: a waveguide structure including a waveguide grating; and an out-of-plane coupler separated from and in optical communication with the waveguide grating; wherein the waveguide grating and the out-of-plane coupler are separated by a distance that will yield an optical resonance at a desired operating frequency or wavelength of an optical signal, thereby maximizing a diffraction power of the optical signal at the out-of-plane coupler while minimizing a reflection power of the optical signal at the out-of-plane coupler.

Example 2 includes the device of Example 1, wherein the waveguide grating comprises a waveguide Bragg grating.

Example 3 includes the device of Examples 1-2, wherein the out-of-plane coupler comprises a grating coupler.

Example 4 includes the device of Example 3, wherein the grating coupler includes one or more grating elements.

Example 5 includes the device of any of Examples 1-2, wherein the out-of-plane coupler comprises a focused ion beam etched mirror.

Example 6 includes the device of any of Examples 1-5, wherein the diffraction power of the optical signal is maximized at a particular wavelength, and the reflection power of the optical signal is minimized at the particular wavelength.

Example 7 includes the device of any of Examples 1-6, wherein the reflection power of the optical signal at the out-of-plane coupler is effectively zero.

Example 8 includes the device of any of Examples 1-7, wherein the device is implemented in an integrated photonics circuit or chip.

Example 9 includes the device of any of Examples 1-7, wherein the device is implemented in a light detection and ranging (LiDAR) system.

Example 10 includes the device of any of Examples 1-7, wherein the device is implemented in a free-space optical communication system, or in a Li-Fi system.

Example 11 includes the device of any of Examples 1-7, wherein the device is implemented in an emitter for an optical phased array.

Example 12 includes a method of fabricating a free-space coupler device, the method comprising: determining a separation distance between a waveguide grating of a waveguide structure and a out-of-plane coupler that will effectively yield an optical resonance at a desired operating frequency or wavelength of an optical signal; forming the waveguide structure including the waveguide grating; and forming the free-space coupler at the separation distance from the waveguide grating.

Example 13 includes the method of Example 12, wherein the separation distance is determined such that a diffraction power of the optical signal is maximized at a particular wavelength, and a reflection power of the optical signal is minimized at the particular wavelength.

Example 14 includes the method of any of Examples 12-13, wherein the waveguide grating is formed as a waveguide Bragg grating.

Example 15 includes the method of any of Examples 12-14, wherein the out-of-plane coupler is formed as a grating coupler.

Example 16 includes the method of any of Examples 12-14, wherein the out-of-plane coupler is formed as a focused ion beam etched mirror.

Example 17 includes a free-space coupler device comprising: a substrate including a facet at one end of the substrate; and a waveguide structure including a waveguide grating on the substrate, wherein one end of the waveguide structure adjoins with the facet; wherein the waveguide grating and the one end of the waveguide structure that adjoins with the facet are separated by a distance that will yield an optical resonance at a desired operating frequency or wavelength of an optical signal, thereby maximizing a transmission power of the optical signal away from the facet while minimizing a reflection power of the optical signal at the facet.

Example 18 includes the device of Example 17, wherein the waveguide grating comprises a waveguide Bragg grating.

Example 19 includes the device of any of Examples 17-18, wherein the transmission power of the optical signal is maximized at a particular wavelength, and the reflection power of the optical signal is minimized at the particular wavelength.

Example 20 includes the device of any of Examples 17-19, wherein the reflection power of the optical signal at the facet is effectively zero.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A free-space coupler device, comprising:
   a waveguide structure including a waveguide grating; and
   an out-of-plane coupler separated from and in optical communication with the waveguide grating;
   wherein the waveguide grating and the out-of-plane coupler are separated by a distance that will yield an optical resonance at a desired operating frequency or wavelength of an optical signal, thereby maximizing a diffraction power of the optical signal at the out-of-plane coupler while minimizing a reflection power of the optical signal at the out-of-plane coupler.

2. The device of claim 1, wherein the waveguide grating comprises a waveguide Bragg grating.

3. The device of claim 1, wherein the out-of-plane coupler comprises a grating coupler.

4. The device of claim 3, wherein the grating coupler includes one or more grating elements.

5. The device of claim 1, wherein the out-of-plane coupler comprises a focused ion beam etched mirror.

6. The device of claim 1, wherein the diffraction power of the optical signal is maximized at a particular wavelength, and the reflection power of the optical signal is minimized at the particular wavelength.

7. The device of claim 1, wherein the reflection power of the optical signal at the out-of-plane coupler is effectively zero.

8. The device of claim 1, wherein the device is implemented in an integrated photonics circuit or chip.

9. The device of claim 1, wherein the device is implemented in a light detection and ranging (LiDAR) system.

10. The device of claim 1, wherein the device is implemented in a free-space optical communication system, or in a Li-Fi system.

11. The device of claim 1, wherein the device is implemented in an emitter for an optical phased array.

12. A method of fabricating a free-space coupler device, the method comprising:
   determining a separation distance between a waveguide grating of a waveguide structure and an out-of-plane coupler that will effectively yield an optical resonance at a desired operating frequency or wavelength of an optical signal;
   forming the waveguide structure including the waveguide grating; and
   forming the out-of-plane coupler at the separation distance from the waveguide grating;
   wherein the separation distance is determined such that a diffraction power of the optical signal is maximized at the out-of-plane coupler, and a reflection power of the optical signal is minimized at the out-of-plane coupler.

13. The method of claim 12, wherein the separation distance is determined such that the diffraction power of the optical signal is maximized at a particular wavelength, and the reflection power of the optical signal is minimized at the particular wavelength.

14. The method of claim 12, wherein the waveguide grating is formed as a waveguide Bragg grating.

15. The method of claim 12, wherein the out-of-plane coupler is formed as a grating coupler.

16. The method of claim 12, wherein the out-of-plane coupler is formed as a focused ion beam etched mirror.

17. A free-space coupler device, comprising:
   a substrate including a facet at one end of the substrate; and
   a waveguide structure including a waveguide grating on the substrate, wherein one end of the waveguide structure adjoins with the facet;
   wherein the waveguide grating and the one end of the waveguide structure that adjoins with the facet are separated by a distance that will yield an optical resonance at a desired operating frequency or wavelength of an optical signal, thereby maximizing a transmission power of the optical signal away from the facet while minimizing a reflection power of the optical signal at the facet.

18. The device of claim 17, wherein the waveguide grating comprises a waveguide Bragg grating.

19. The device of claim 17, wherein the transmission power of the optical signal is maximized at a particular wavelength, and the reflection power of the optical signal is minimized at the particular wavelength.

20. The device of claim 17, wherein the reflection power of the optical signal at the facet is effectively zero.

* * * * *